(12) United States Patent
Luk

(10) Patent No.: US 6,810,678 B1
(45) Date of Patent: Nov. 2, 2004

(54) INTERNAL COMBUSTION ENGINE

(76) Inventor: Chi Lam Luk, Room 7, 16th Floor, Ting Kay House, Siu On Court, Tuen Mun, New Territories, Hong Kong (HK)

( * ) Notice: Subject to any disclaimer, the term of this patent is extended or adjusted under 35 U.S.C. 154(b) by 0 days.

(21) Appl. No.: 10/609,910

(22) Filed: Jun. 30, 2003

(51) Int. Cl.[7] .............................. F02C 7/20; F23D 14/46
(52) U.S. Cl. .............................. 60/800; 60/778; 60/669; 431/350; 418/176
(58) Field of Search .................. 60/778, 39.6, 633, 60/638, 725, 800, 805, 39.08, 669; 431/114, 350, 352, 353, 215; 418/176

(56) References Cited

U.S. PATENT DOCUMENTS

| | | | | |
|---|---|---|---|---|
| 294,304 A | * | 2/1884 | Blair | 418/176 |
| 741,476 A | * | 10/1903 | Flatau | 418/176 |
| 971,043 A | * | 9/1910 | Hoffman | 418/176 |
| 2,391,360 A | * | 12/1945 | Stephens | 418/176 |
| 2,951,469 A | * | 9/1960 | Schmidt | 418/176 |
| 3,666,038 A | | 5/1972 | Hudspeth, et al. | |
| 3,748,085 A | * | 7/1973 | Poepsel et al. | 431/114 |
| 3,799,734 A | * | 3/1974 | Bailey | 431/353 |
| 3,850,147 A | * | 11/1974 | Doerner | 60/669 |
| 3,906,717 A | * | 9/1975 | Matthews | 60/39.08 |
| 3,925,002 A | * | 12/1975 | Verdouw | 60/737 |
| 4,047,857 A | * | 9/1977 | Fischer | 418/176 |
| 4,106,472 A | | 8/1978 | Rusk | |
| 4,342,297 A | | 8/1982 | Williams | |
| 4,606,721 A | * | 8/1986 | Livingston | 60/725 |
| 4,693,073 A | * | 9/1987 | Blackburn | 60/778 |
| 4,737,100 A | * | 4/1988 | Schnell et al. | 431/350 |
| 4,752,212 A | * | 6/1988 | Breen | 431/215 |
| 4,860,704 A | | 8/1989 | Slaughter | |
| 5,724,811 A | | 3/1998 | Gibby | |
| 6,033,207 A | * | 3/2000 | Cummings | 431/215 |
| 6,106,276 A | * | 8/2000 | Sams et al. | 431/350 |
| 6,363,723 B1 | | 4/2002 | Negre et al. | |

* cited by examiner

Primary Examiner—Thai-Ba Trieu
(74) Attorney, Agent, or Firm—Alix, Yale & Ristas, LLP

(57) ABSTRACT

An internal combustion engine includes an insulated combustion chamber having a fuel mixture inlet and a spark plug nearby the inlet. A series of baffles is configured within the combustion chamber to absorb a shockwave caused by ignition of fuel mixture by the spark plug. A turbine receives reduced-pressure combustion gases from an exhaust-side of the baffles and there is a power takeoff at the turbine.

9 Claims, 4 Drawing Sheets

INTERNAL COMBUSTION ENGINE

BACKGROUND OF THE INVENTION

The present invention relates to internal combustion engines. More particularly, although not exclusively, the invention relates to a combustion engine having improved thermodynamic efficiency.

The inventor postulates that inefficiency in reciprocating piston internal combustion engines is caused mainly by heat loss. Heat losses are caused by the cooling system and other factors. The inventor therefore suggests that insulation is a solution to improved thermodynamic efficiency. A large variety of insulating materials are available. These include refractories, mineral wool blocks, silicate calcium slabs and mineral fibre tiles, which are very effective heat barriers. There is also the Linde type aspirating super insulator, which exhibits a heat conductivity of 0.0015–0.72 mW/m° C. and can be used in a temperature range of 240° C. to 1100° C. However, significant space is required to install these insulators and also, they are susceptible to damage caused by rubbing and high-speed contact. It is suggested therefore that traditional cylinder designs cannot be employed to achieve the desired insulating effects. The inventor suggests that such insulating materials cannot be used unless the combustion chamber is enlarged.

OBJECT OF THE INVENTION

It is an object of the present invention to overcome or substantially ameliorate the above disadvantages and/or more generally to provide and engine having improved thermodynamic efficiency.

SUMMARY OF THE INVENTION

There is disclosed herein an internal combustion engine comprising:
  an insulated combustion chamber having a fuel mixture inlet and a spark plug nearby the inlet,
  a series of baffles configured within the combustion chamber to absorb a shockwave caused by ignition of fuel mixture by the spark plug,
  a turbine receiving reduced-pressure combustion gases from an exhaust-side of the baffles, and
  a power takeoff at the turbine.

Preferably the power takeoff comprises a pulley.
Preferably the pulley belt-drives an oil pump.
Preferably the oil pump drives pressurised oil to a reservoir.
Preferably the reservoir comprises a piston, one side of which communicates with oil in the reservoir, and the other side of which communicates with combustion gases in the combustion chamber.

Preferably there is a high-pressure oil takeoff at the reservoir.

Preferably the turbine comprises a cylindrical housing having a rotor therein, the rotor having a hollow centre receiving exhaust gases from the combustion chamber and a number of radial passages extending from the hollow centre to a periphery of the rotor, the housing comprising an annular space about the rotor periphery with a plurality of buffers extending from the housing to the rotor periphery, the rotor also comprising a plurality of outlet passages extending inwardly from the rotor periphery to exhaust outlets, the rotor further comprising a flap at its periphery between each radial passage and outlet passage, the flaps adapted to close the radial passages upon interaction with the buffers as the rotor rotates.

Preferably the radial passages and outlet passages each comprise butterfly valves.

The preferred embodiment has an enlarged combustion chamber, typically being equal to two to four times the volume of a standard cylinder of an internal combustion engine. This is suggested to provide size sufficient for insulation of insulating materials. An equivalent amount of fuel required for each cycle of explosion or combustion in an ordinary engine is introduced to a single enlarged combustion chamber.

Having enlarged the combustion chamber, temperatures are reduced below 1000 C. and the above-mentioned Linde insulating materials can be used.

BRIEF DESCRIPTION OF DRAWINGS

A preferred form of the present invention will now be described by way of example with reference to the accompanying drawings, wherein.

DESCRIPTION OF PREFERRED EMBODIMENT

Figure 1:
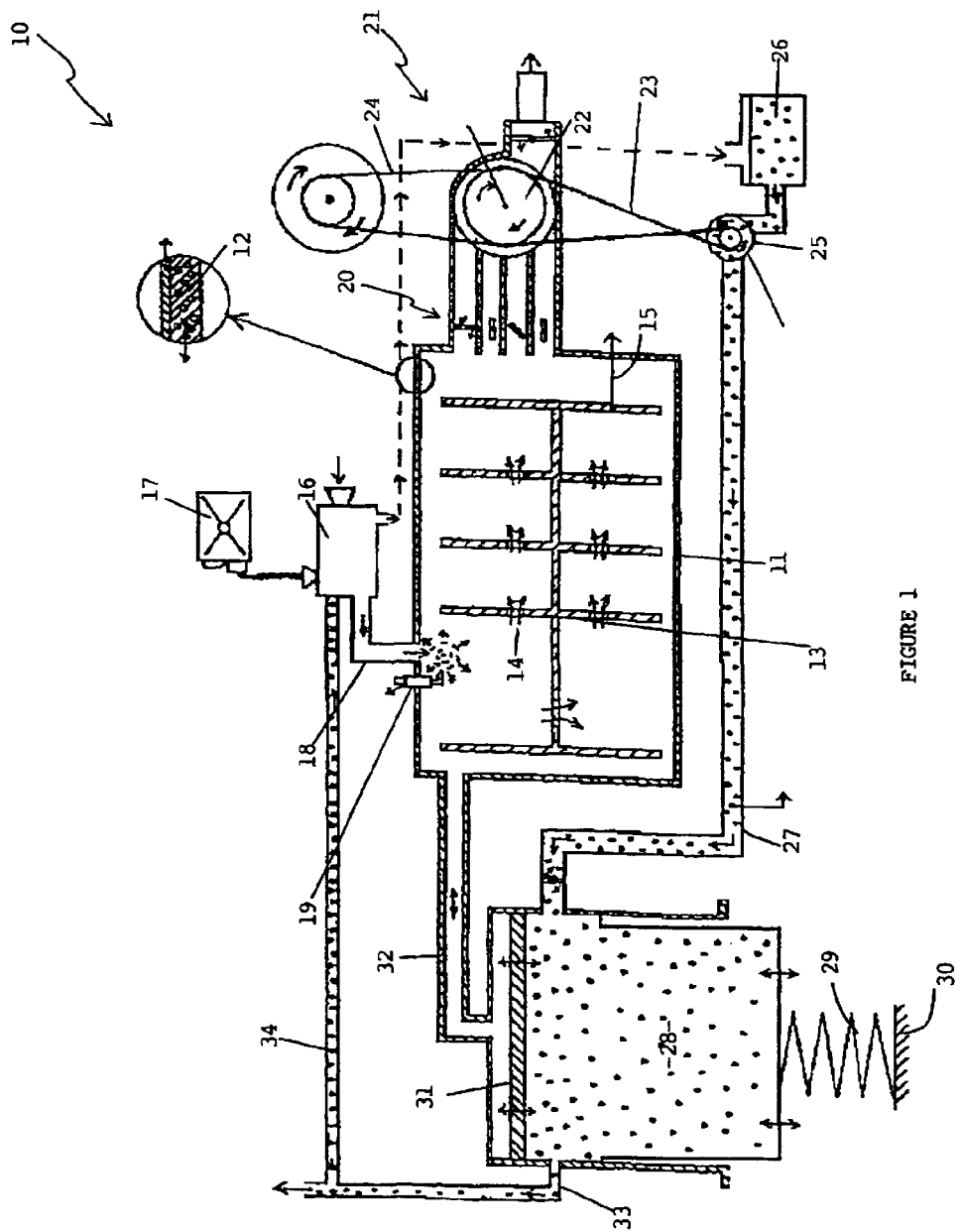
FIG. 1 is a schematic cross-sectional elevation of an engine.

In the accompanying drawings there is depicted schematically an engine 10. Engine 10 comprises a combustion chamber 11, typically fabricated from metal and having an internal insulation layer 12. The material chosen for the insulation layer is typically a Linde type aspirating super insulator as noted above. Within the combustion chamber 11 there is a framework of baffles 13 comprising a series of plates having apertures 14 therethrough. The baffle plates are typically fabricated from heat resisting alloys or other material adapted to conduct heat away as shown at 15 in FIG. 1. The baffles 13 function to absorb radiation in the form of heat produced by the combustion gases and to conduct heat to cool areas.

There is a carburettor 16 receiving fuel 17 and mixing it with air for delivery through inlet port 18 to the combustion chamber 11. There is a spark plug 19 alongside the inlet port for igniting fuel mixture within the combustion chamber 11. Attached at 20 to the combustion chamber 11 is a turbine 21 having a drive pulley 22 from which their extends drive belts 23 and 24. Drive belt 23 drives an oil pump 25 which draws oil from an oil reservoir 26 for pressurised delivery via oil line 27 to an oil pressure chamber 28. Oil pressure chamber 28 is mounted upon a spring 29 to a fixed surface 30. There is a piston plate 31 upon the oil within the oil pressure chamber 28. The other side of the piston plate 21 communicates via combustion gas line 32 with the combustion chamber 11. That is, output power of the turbine 21 can be used to inject energy back into the combustion chamber. There is an oil outlet 33 beneath the piston plate 31 for delivering pressurised oil to ancillary equipment. This oil can also travel along a return path 34 to the oil reservoir 26 for re-pumping by the oil pump 25.

Figures 2, 3:
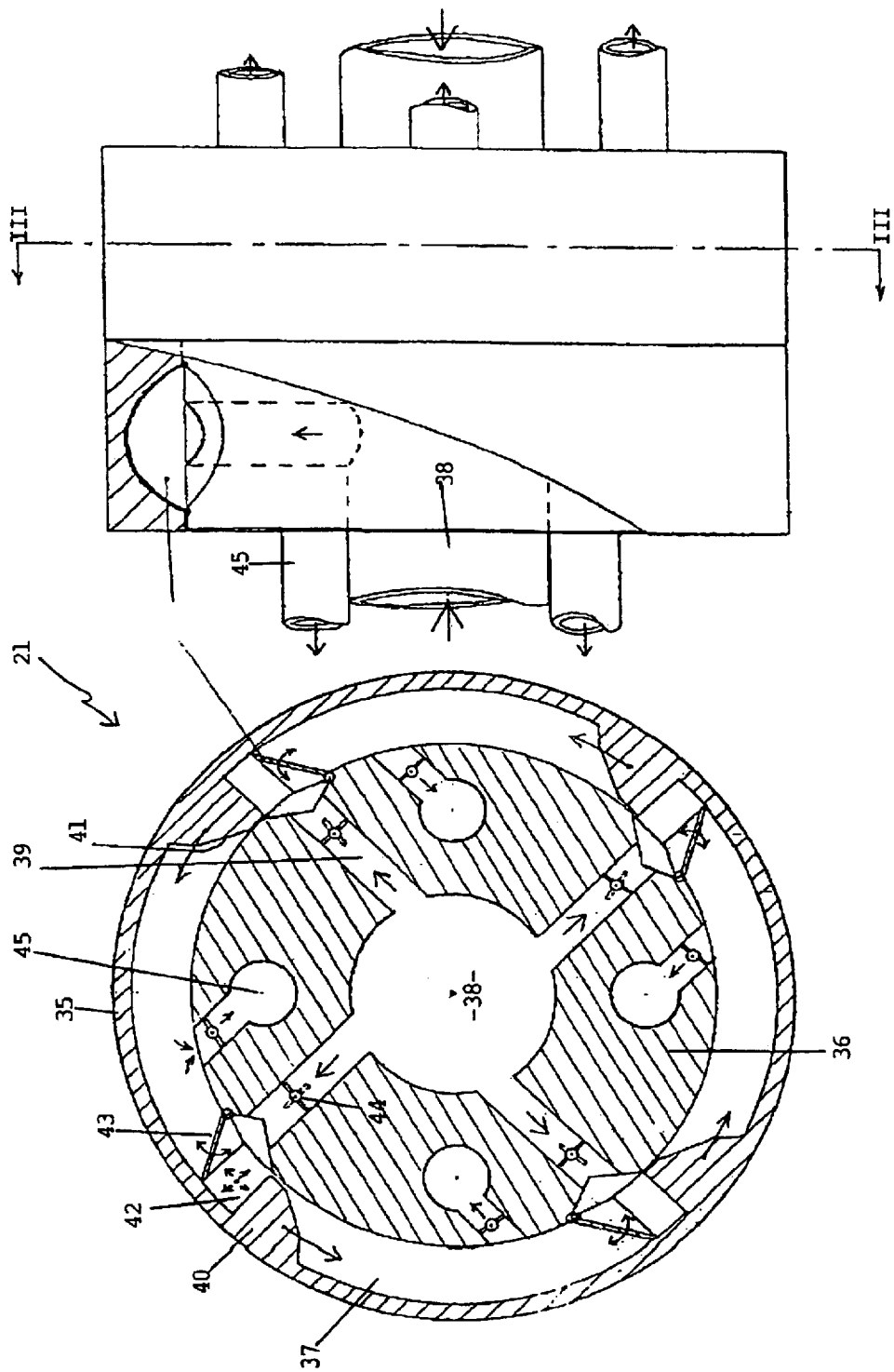
FIG. 2 is a schematic cross-sectional elevation of a turbine forming part of the engine of FIG. 1.
FIG. 3 is a schematic cross-sectional elevation of the turbine taken at III—III in FIG. 2.

As shown in FIGS. 2 and 3, the turbine 21 includes a housing 35 of substantially cylindrical form. Within the housing 35, there is a rotor 36. Surrounding the rotor 36 is an annulus 37. The rotor 36 is mounted on a shaft (not shown) and has a hollow center/port 38 that receives combustion gas from the combustion chamber 11 via hollow center/port 38. This pressurised gas passes outwardly along the radial passages 39 en route to the annulus 37. Extending inwardly from the housing 35 are a number of buffers 40 having ramped faces 41 and flat faces 42. Attached to the rotor 36 adjacent to each radial passage 39 is a flap 43. Each flap 43 together with its associated flat face 42 defines a pressure chamber that can be closed by a butterfly valve 44 within the passage 39. A number of exhaust passages 45 extend inwardly from the periphery of the rotor 36 and these carry exhaust gases away. The pressure in the hollow center/port 38 causes combustion gas to flow along each radial passage 39 to cause clockwise rotation of the rotor 36 due to gas—force exerted on each flap 43. During clockwise rotation, spent gas at the other side of each flap 43 escapes via the exhaust passages 45. When the flap encounters the ramped surface 41 of the next buffer 40, it closes enabling rotation of the rotor 36 to continue. The flaps might be spring biased to re-open. The rotor 36 is connected to the drive pulley 22.

The oil pressure chamber 28 acts as a pressure buffer device serving to alleviate excessive pressure. This device prevents explosive failure of the combustion chamber 11. It further serves to stabilise pressure within the combustion chamber for delivery to the turbine 21. It also serves as a standby hydraulic system for powering ancillary hydraulic equipment such as door closing devices, steering wheel retractors, seat belts, hydraulic suspension and the like. More importantly, when the internal combustion engine of the preferred embodiment is installed in a motor vehicle, the vehicle may come to a standstill without omission of exhaust gas for a short period of time before moving off at traffic lights for example.

The output of rotor 36 need not be reduced by a transmission gearbox. Output torque can be altered by varying the number of pressure chambers. That is, a multiple in-line arrangement of rotors 36 can be mounted on a common shaft. Each would have its own hollow center/port 38 and these can be operated individually or in unison, depending upon required output torque. There is an absence of combustion about the rotor itself. That is, the turbine cannot be considered to be of the traditional two or four-stroke design.

Figure 4:
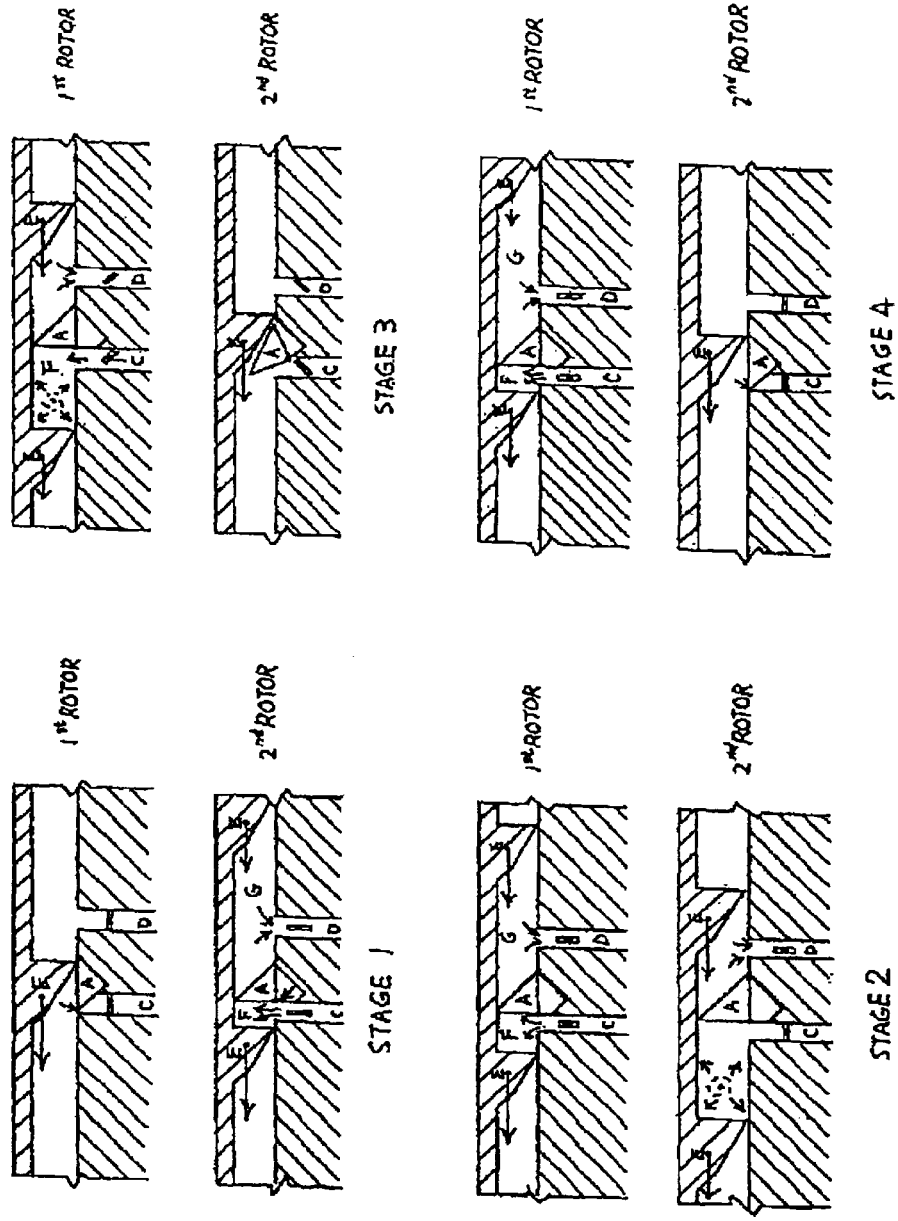
FIG. 4 depicts a sequence of positions of a rotor within the turbine of FIGS. 2 and 3.
Figure 5:
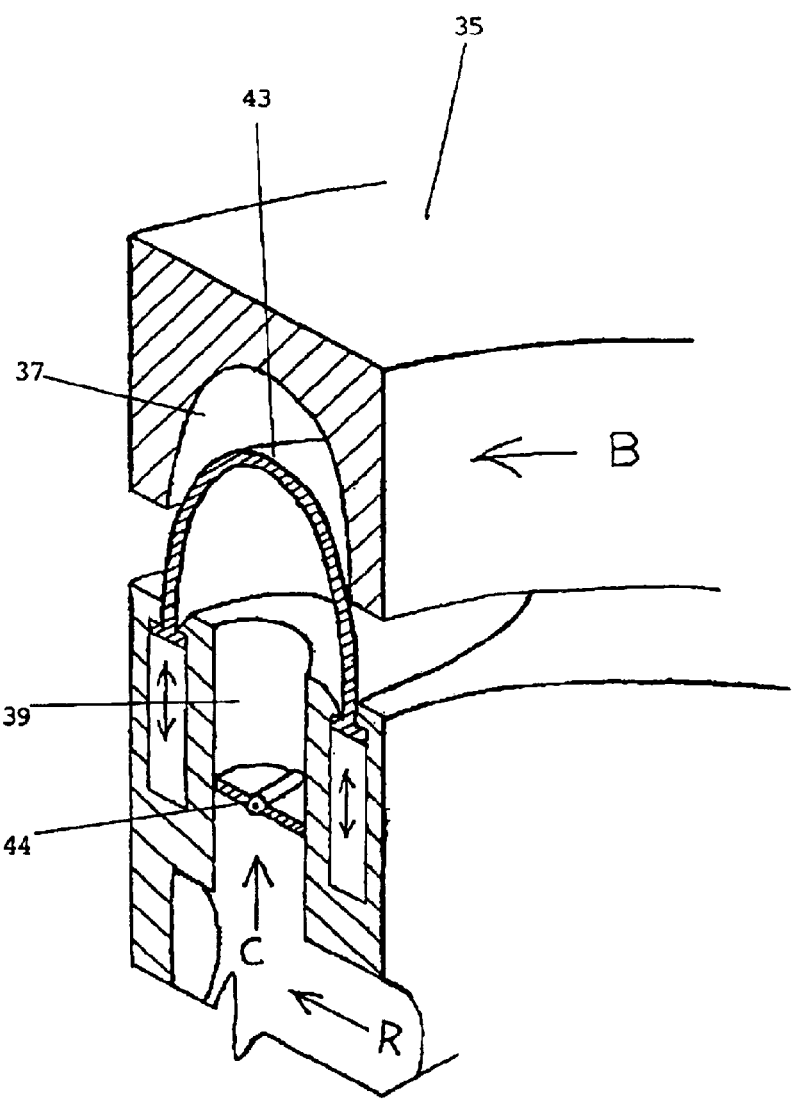
FIG. 5 is a schematic perspective cross-sectional illustration of parts of the turbine of FIGS. 2 to 4.

FIG. 4 depicts operational phases of a two-rotor engine. These will not be described in detail. Suffice to say that when the driving force of one rotor diminishes, the other rotor can compensate. To this end, when two rotors are mounted upon a common shaft, one would be angularly offset with respect to the other.

It should be appreciated that modifications and alterations obvious to those skilled in the art are not to be considered as beyond the scope of the present invention.

What is claimed is:

1. An internal combustion engine comprising:
an insulated combustion chamber having a fuel mixture inlet and a spark plug nearby the inlet,
a series of baffles configured within the combustion chamber to absorb a shockwave caused by ignition of fuel mixture by the spark plug,
a turbine receiving reduced-pressure combustion gases from an exhaust-side of the baffles, and
a power takeoff at the turbine, said power take off comprising a pulley,
wherein the pulley belt drives an oil pump.

2. An internal combustion engine comprising:
an insulated combustion chamber having a fuel mixture inlet and a spark plug nearby the inlet,
a series of baffles configured within the combustion chamber to absorb a shockwave caused by ignition of fuel mixture by the spark plug,
a turbine receiving reduced-pressure combustion gases from an exhaust-side of the baffles,
a power takeoff at the turbine, said power take off comprising a pulley,
an oil pump driven from said pulley, and
a reservoir arranged to receive pressurized oil from said oil pump.

3. An internal combustion engine comprising:
an insulated combustion chamber having a fuel mixture inlet and a spark plug nearby the inlet,
a series of baffles configured within the combustion chamber to absorb a shockwave caused by ignition of fuel mixture by the spark plug,
a turbine receiving reduced-pressure combustion gases from an exhaust-side of the baffles,
a power takeoff at the turbine arranged to drive an oil pump; and
an oil reservoir configured to receive pressurized oil from the oil pump, said reservoir comprising:
a piston, one side of which communicates with oil in the reservoir and the other side of which communicates with the combustion chamber, and
biasing means for resiliently biasing the reservoir to adjust the capacity thereof.

4. The internal combustion engine of claim 3, wherein the power takeoff comprises a pulley.

5. The internal combustion engine of claim 4, wherein the pulley belt drives the oil pump.

6. The internal combustion engine of claim 3, wherein there is a high-pressure oil takeoff at the reservoir.

7. The internal combustion engine of claim 3, wherein the turbine comprises a cylindrical housing having a rotor therein, the rotor having a hollow center receiving exhaust gases from the combustion chamber and a number of radial passages extending from the hollow center to a periphery of the rotor, the housing comprising an annular space about the rotor periphery with a plurality of buffers extending from the housing to the rotor periphery, the rotor also comprising a plurality of outlet passages extending inwardly from the rotor periphery to exhaust outlets, the rotor further comprising a flap at its periphery between each radial passage and outlet passage, the flaps adapted to close the radial passages upon interaction with the buffers as the rotor rotates.

8. The internal combustion engine of claim 7, wherein the radial passages and outlet passages each comprise butterfly valves.

9. An internal combustion engine comprising:
an insulated combustion chamber having a fuel mixture inlet and a spark plug nearby the inlet,
a series of baffles configured within the combustion chamber to absorb a shockwave caused by ignition of fuel mixture by the spark plug,
a turbine receiving reduced-pressure combustion gases from an exhaust-side of the baffles, said turbine comprising a cylindrical housing having a rotor therein, the rotor having a hollow center receiving exhaust gasses from the combustion chamber and a number of radial passages extending from the hollow center to a periphery of the rotor, the housing comprising an annular space about the rotor periphery with a plurality of buffers extending from the housing to the rotor periphery, the rotor also comprising a plurality of outlet passages extending inwardly from the rotor periphery to exhaust outlets, the rotor further comprising a flap at its periphery between each radial passage and outlet passage, the flaps adapted to close the radial passages upon interaction with the buffers as the rotor rotates, and a power takeoff at the turbine.

* * * * *